(12) United States Patent
Beyer et al.

(10) Patent No.: US 9,274,993 B2
(45) Date of Patent: Mar. 1, 2016

(54) INTERFACE DEVICE AND METHOD FOR CONSISTENTLY EXCHANGING DATA

(71) Applicant: Siemens Aktiengesellschaft, Munich (DE)

(72) Inventors: Hans-Jürgen Beyer, Wildenfels (DE); Markus Bodenschatz, Hohenstein-Ernstthal (DE); Andreas Klug, Reinsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 281 days.

(21) Appl. No.: 13/847,861

(22) Filed: Mar. 20, 2013

(65) Prior Publication Data

US 2013/0254450 A1    Sep. 26, 2013

(30) Foreign Application Priority Data

Mar. 23, 2012 (EP) .................................... 12161076

(51) Int. Cl.
*G06F 13/36* (2006.01)
*G06F 13/40* (2006.01)

(52) U.S. Cl.
CPC ........ *G06F 13/4059* (2013.01); *G06F 13/4036* (2013.01)

(58) Field of Classification Search
CPC ..................................... G06F 13/4059; H04L 2012/40215–2012/4026
See application file for complete search history.

(56) References Cited

U.S. PATENT DOCUMENTS

| | | | |
|---|---|---|---|
| 5,345,378 A | 9/1994 | Lang et al. | |
| 5,927,218 A | 7/1999 | Tretter et al. | |
| 6,446,202 B1 * | 9/2002 | Krivoshein et al. | 713/1 |
| 6,449,715 B1 * | 9/2002 | Krivoshein | 713/1 |
| 6,970,950 B2 | 11/2005 | Aumer et al. | |
| 7,174,406 B1 * | 2/2007 | Abdallah et al. | 710/240 |
| 7,911,967 B2 * | 3/2011 | Saitou et al. | 370/252 |
| 8,069,289 B2 * | 11/2011 | Hafer et al. | 710/105 |
| 8,219,790 B2 * | 7/2012 | Chomik et al. | 713/1 |
| 8,539,122 B2 * | 9/2013 | Biehler et al. | 710/62 |
| 8,670,460 B2 * | 3/2014 | Breit et al. | 370/473 |

(Continued)

FOREIGN PATENT DOCUMENTS

| | | |
|---|---|---|
| DE | 195 29 718 | 2/1997 |
| DE | 199 09 081 | 9/2000 |

(Continued)

OTHER PUBLICATIONS

Heidepriem, J. "Prozessinformatik 1—Grundzüge der Informatik", Oldenbourg Verlag; pp. 222-251; ISBN 3-486-27010-9, 2000.

(Continued)

*Primary Examiner* — Raymond Phan
(74) *Attorney, Agent, or Firm* — Cozen O'Connor

(57) ABSTRACT

An interface device for exchanging data between a first bus system and a second bus system, wherein an input/output device is connectable to the second bus system and within the input/output device includes an addressable slot and an addressable subslot for output or acceptance of input/output data to optimize the consistent exchange of the data between the bus systems. A data transfer device including a transfer memory is connected via the control device and a list storage device in which a data structure for addressing the data for the input/output device is stored, and wherein the data structure is predetermined for a plurality of subslots in a telegram format of the telegrams of the first bus system.

14 Claims, 6 Drawing Sheets

(56) References Cited

U.S. PATENT DOCUMENTS

| | | | |
|---|---|---|---|
| 8,880,197 B2* | 11/2014 | Colucci et al. | 700/9 |
| 2003/0099229 A1* | 5/2003 | Tretter et al. | 370/364 |
| 2003/0145146 A1* | 7/2003 | Posner et al. | 710/200 |
| 2004/0250025 A1* | 12/2004 | Bruckner et al. | 711/149 |
| 2005/0054355 A1* | 3/2005 | Saitou et al. | 455/463 |
| 2006/0087967 A1 | 4/2006 | Landwehr et al. | |
| 2008/0221707 A1* | 9/2008 | Saitou et al. | 700/3 |
| 2009/0138693 A1* | 5/2009 | Chomik et al. | 713/1 |
| 2009/0265492 A1 | 10/2009 | Hoffmann | |
| 2010/0030935 A1* | 2/2010 | Hafer et al. | 710/105 |
| 2010/0074262 A1* | 3/2010 | Breit et al. | 370/400 |
| 2010/0146225 A1 | 6/2010 | Biehler et al. | |
| 2011/0010475 A1 | 1/2011 | Wahlmann et al. | |
| 2011/0153036 A1 | 6/2011 | Colucci et al. | |
| 2011/0283027 A1 | 11/2011 | Buesching et al. | |
| 2014/0108685 A1* | 4/2014 | Ismail | 710/105 |

FOREIGN PATENT DOCUMENTS

| | | |
|---|---|---|
| DE | 100 49 049 | 12/2001 |
| DE | 10 2004 039 932 | 3/2006 |
| DE | 10 2007 054 417 | 5/2009 |
| DE | 10 2008 019 277 | 10/2009 |
| DE | 10 2009 032 229 | 1/2011 |
| DE | 10 2010 001 211 | 6/2011 |
| DE | 10 2010 020 446 | 11/2011 |
| DE | 10 2010 027 286 | 1/2012 |
| EP | 0 525 214 | 2/1993 |
| EP | 1 253 494 | 10/2009 |
| EP | 2 197 160 | 6/2010 |
| WO | WO 02/086634 | 10/2002 |
| WO | WO 2007102779 A1 * | 9/2007 |

OTHER PUBLICATIONS

Heinz, Prof. Dr.-Ing F. "Industrielle Kommunikation mit Profinet", Campus Künzelsau, Reinhold-Würth-Hochschule; Heruntergeladen am Apr. 23, 2015, pp. 1-6, 2009.

Popp, M./PROFINET, "Fundamentals", als Hintergrundinformation zum besseren Verständis der Fachterminologie; Folien 12-15; heruntergeladen am Apr. 23, 2015.

* cited by examiner

INTERFACE DEVICE AND METHOD FOR CONSISTENTLY EXCHANGING DATA

BACKGROUND OF THE INVENTION

1. Field of the Invention

The invention relates to an interface device for exchanging data between a first bus system and a second bus system, where an input/output device is connectable to the second bus system and an addressable slot and an addressable subslot is located within the input/output device for outputting or receiving input/output data, and where the interface device comprises a first transceiver device for the data of the first bus system, a second transceiver device for the data of the second bus system, a data transfer to device with a transfer memory, and a control device configured to control the data storage and coordinate write accesses into or at the data transfer device.

2. Description of the Related Art

In automation technology, there is particularly an exchange of payload data, i.e., input and output data from components to be automated such as machines, actuator drives or sensors, between input/output devices such as modular decentralized peripheral systems for example and higher-ranking automation devices via field buses. Known examples of field buses are Profibus or Profinet. Within an input/output device of a decentralized peripheral station, payload data can be distributed to individual modules or read out from the individual modules. The field bus and the backplane bus system generally operate asynchronously in relation to one another and an updating of data, for example, of a subslot payload data packet, is also only possible in some cases. As a reusit, a buffer is necessary to ensure data consistency between the two bus systems.

Such buffers, or also alternating buffers, are known from the European patent application EP 1 253 494 B1. In the known open-loop and/or closed-loop control system where via a field bus a decentralized peripheral is accessed, it is disadvantageous that it can no longer keep pace with the current speed demands made on payload data exchanges.

SUMMARY OF THE INVENTION

It is therefore an object of the invention to provide an interface device exchanging data or a method for consistently exchanging data that is optimized and achieves the previous exchange of data more quickly while consistently data safeguarding the data.

This and other objects and advantages are achieved in accordance with the invention by providing a control device of an interface which is connected to a list storage device, in which a data structure for addressing the data for the input/output device is stored, where the data structure is predetermined for a plurality of subslots in a telegram format of the telegrams of the first bus system and in each case has a memory offset related to a start address of the transfer memory and a data link of the input/output data, where an index is assigned to the subslots in the data structure, where the control device is further configured, when the input output data is updated, to coordinate with the aid of the index the write accesses into the data transfer device byte-by-byte. The interface device is, for example, implemented in an interface module between a higher-ranking automation device and a subordinate decentralized periphery. In relation to a Profinet application, such a Profinet I/O-system comprises the following devices: an I/O controller, which represents the control unit which handles the automation tasks. An I/O device, which represents a field device, especially an input/output device, which is monitored and controlled by the I/O controller. An I/O device can consist of a number of modules and submodules. An I/O supervisor, which represents a development tool, typically based on a PC, in order to set the parameters for and perform diagnostics for the individual I/O devices and I/O controllers. In relation to the list storage device, the parameterization data of the I/O device, i.e., of the input/output devices, is advantageously used for the byte-by-byte coordination of write accesses in the data transfer device of the interface device. With the list storage device, the interface device now has a reference list available to it which is used for fast addressing of the data in the data transfer device or in the transfer memory.

Advantageously, the transfer memory is subdivided into an output buffer and an input buffer. In this case, the output buffer is configured to buffer data from the first bus system and to provide the buffered data for the second bus system as output data for the input/output device and the input buffer is configured to buffer data from the second bus system and provide the buffered data for the first bus system as input data of the input/output device.

Preferably, the transfer memory is comprises a first transfer memory and a second transfer memory, where the transfer memory is connected to the control device such that data can only be stored in or a write access can only be performed to the first transfer memory or to the second transfer memory. In this case, each transfer memory now in its turn has an output buffer and an input buffer, respectively.

In order to further optimize the data transfer and especially the data consistency, the control device has a blocking device which is configured, before a write access with output data to the output buffer or before a read access of input data to the input buffer, to set a status indicator, where the control device is further configured so that the blocking device blocks a switch between the first and the second transfer memory when the status indicator is set.

In the byte-by-byte setup of the transfer memory, it has proved to be especially advantageous for the control device to further, for a read access of output data at the output buffer, to interrogate a semaphore and, depending on the status of the semaphore, to either read out the output data from the first transfer buffer or from the second transfer buffer. A semaphore variable is, for example, a data structure that consists of an integer and usage operations, such as "reserve, test" and "release". It is especially suitable for administration of restricted enumerable resources to which a number of processes or threads are preferably to have access, such as a generator and a load. By contrast with locking variables, the lock, the activity carriers, the "reserve" and "release", do not need to be identical.

In order to optimize an updating of data the transfer memory is set up byte-by-byte and each byte is assigned a semaphore with the index, in this case a byte in the first transfer memory is assigned the semaphore with the first state and a corresponding byte in the second transfer memory is assigned the semaphore with the second state, where the second state corresponds to the negated first state.

So that during ongoing operation of an automation device with a decentralized peripheral, in relation to the issuing of data of the I/O device, for example, when setting up or clearing down additional application relationships (connections) with further Profinet controllers, jumpering becomes possible, the list storage device is specified in duplicate and configured as a first list storage device and a second list storage device.

With respect to the industrial automation technology already mentioned, an especially advantageous embodiment of the interface device is configured to operate within the network of an industrial automation system, where the first transceiver device is configured for data of the first bus system to send and receive data of a field bus of industrial automation technology and the second transceiver device for data of the second bus system is configured to send and receive data of a backplane bus of the input/output device which comprises a decentralized peripheral of the industrial automation technology, where the control device also includes a backplane controller and a field bus controller.

The task stated at the outset of optimizing the operation in a decentralized peripheral system is likewise achieved by a method for consistent exchange of data between a first bus system and the second bus system, where an input/output device is connected to the second bus system and within the input/output device a slot and a subslot for output or receipt of input/output data is addressed, where a data transfer device with a transfer memory is controlled by a control device for controlling the data storage and for coordination of write accesses into or at the data transfer device, where the control device evaluates a data structure from a list storage means, where the data structure for addressing the data for the input/output device has been stored before the beginning of the data exchange in the list storage device and the data structure is defined based on a plurality of subslots in a telegram format of the telegrams of the first bus system and in each case has a memory offset related to a start address of the transfer memory and a data length of the input/output data, where an index is assigned to the subslots in the data structure, where the control device, during updating of the input/output data, coordinates the write accesses in the data transmission device with the aid of the index.

Preferably, the transfer memory is divided into an output buffer and an input buffer, where the output buffer is operated to buffer data from the first bus system and provide the buffered data for the second bus system as output data for an input/output device and the input buffer is operated to buffer data from the second bus system and provide the buffered data for the first bus system as input data of the input/output device.

The transfer memory is divided into the first transfer memory and a second transfer memory, and the storage of data or a write access are controlled so that there is only access to the first transfer memory or to the second transfer memory.

In accordance with the method, a locking device is operated in the control device, where before a write access with output data to the output buffer or before a read access of input data at the input buffer, a status indicator is set, and once the status indicator is set, a switch between the first and the second transfer memory is blocked.

Regarding the byte-by-byte addressing of the transfer memory, i.e., the output buffer and the input buffer, for a read access of output data from the output buffer, a semaphore is interrogated and depending on the status of the semaphore, the output data is either read from the first transfer memory or from the second transfer memory. The data is stored byte-by-byte in the transfer memory and each byte is assigned a semaphore with the index. As a result, a byte in the first transfer memory is assigned the semaphore with a first state and a corresponding byte in the second transfer memory is assigned the semaphore with a second state, where the second state corresponds to the negated first state. For data consistency the transfer memory is duplicated, which is why a byte and a corresponding byte will be referred to here.

The list storage device is advantageously a duplicated list and operated in duplicate, and indeed a first list storage device and a second list storage device is set up.

The method is used to particular advantage in the network of an industrial automation system, where the first transceiver device is operated for data of a field bus of the industrial automation technology and the second transceiver device is operated for data of a backplane bus of the input/output device which comprises a decentralized peripheral of the industrial automation technology. In this case, a backplane bus controller and a field bus controller are also operated in the control device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing shows a possible exemplary embodiment of the interface device or a possible execution sequence of the method, in which.

DETAILED DESCRIPTION OF THE PREFERRED EMBODIMENTS

Figure 1:
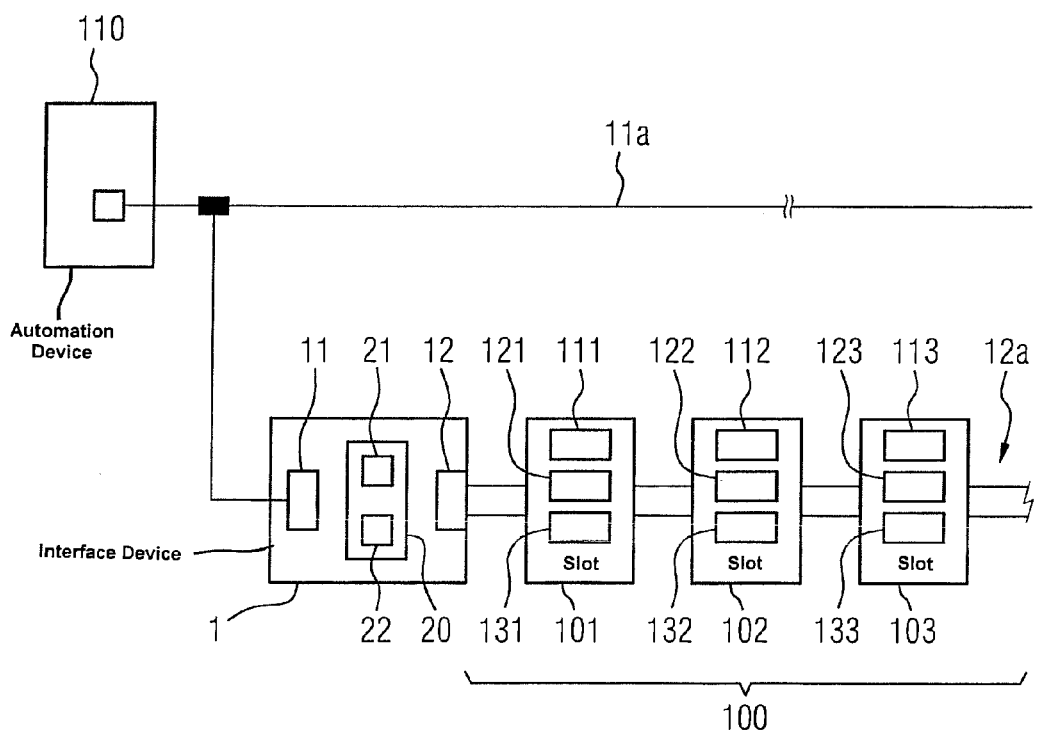
FIG. 1 shows an automation device with a connected decentralized peripheral in accordance with the invention.

In accordance with FIG. 1, an automation device 110 is connected to a first bus system 11a, where an interface device 1 with an input/output device 100 in a modular decentralized peripheral design is connected to the first bus system 11a. A connection exists via a first transceiver device 11 between the interface device 1 and the automation device 110. There is a connection via a second transceiver device 12 between the interface device 1 via a second bus system 12a and the input/output device 100, where the input/output device 100 has a first slot 101, a second slot 102 and a third slot 103. The slots 101, 102, 103 in their turn each divided into three subslots, i.e., 111, 121, 131 and 112, 122, 132 and 113, 123, 133.

For exchange of data between the automation device 110 and the slots 101, . . . , 103, which are configured as input/output modules, the interface device 1 has a data transfer device 20, which is divided up into a first transfer memory 21 and a second transfer memory 22.

Figure 2:
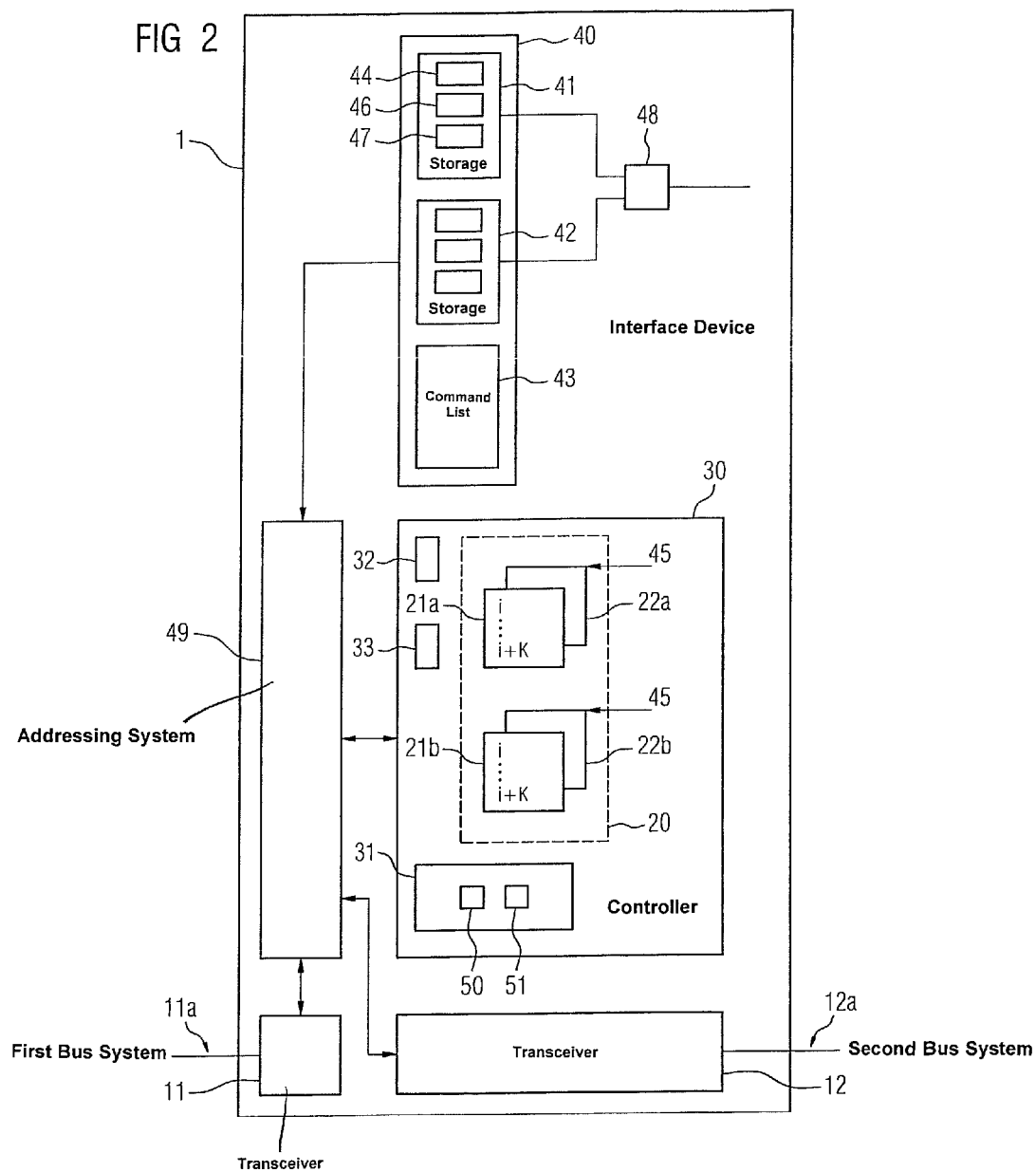
FIG. 2 shows a schematic block circuit diagram of a controller and a list storage device of an interface device in accordance with the invention.

In accordance with FIG. 2, the interface device 1 of FIG. 1 is shown schematically in a block circuit diagram. The interface device 1 for exchanging data of the first bus system 11a and of the second bus system 12a is connected to the first bus system 11a at a first transceiver unit 11, where the first bus system 11a comprises, for example, an industrial Profinet field bus. The second bus system 12a, which comprises, for example, the backplane bus of a modular-construction peripheral system, is connected to the second transceiver device 12a. The transceiver devices 11, 12 are linked to an addressing system 49. The addressing system 49 obtains notification via a list storage device 40 of a data structure for addressing the data for the input/output device 100 (see FIG. 1), the data structure in this case contains a plurality of subslots 111, 112, 113 in a telegram format of the telegrams of the first bus system 11a.

The respective data structure in this case has the following structure: For each byte to be addressed in the first transfer memory 21 or the second transfer memory 22, there is a memory offset 44 available, related to a start address 45 of the first and/or second transfer memory 21, 22. Furthermore the list storage device 40 also has a data length 46 of the input/output data. The data structure with the memory offset 44 and the data length 46 is assigned to the subslots 111, 112, 113 via an index (i). The list storage device 40 is formed in duplicate as a first list storage device 41 and as a second list storage device 42. It is determined via a selector 48 in each case whether the first list storage device 41 or the second list storage device 42 provides input data for the addressing system 49.

A switchover from a first list storage device 41 to the second list storage device 42 can be advantageous if, for example, a Profinet I/O constellation is changed via an engineering system during the course of operation. Thus, up to the time at which the changed data is to be accepted, operation will be with the configuration in the first list storage device 41 and, after a switchover point, operation is with a new configuration, which has been stored, for example, in the second list storage 42.

The addressing system 49 is supported via a command list 43. In this example, the controller 30 simultaneously contains the data transfer device 20, which is basically subdivided into a first transfer memory 21 and into a second transfer memory 22, where the first transfer memory 21 is subdivided for its part into a first output buffer 21a and into a second output buffer 22a and the second transfer memory into a first input buffer 21b and into a second input buffer 22b. The start address 45 points in each case to a start of a memory area.

A backplane controller 32 and a field bus controller 33 are available to coordinate write/read accesses to the memory areas.

In order to obtain a coordinated access, a first status indicator 50 and a second status indicator 51 are set via a blocking device 31.

The first status indicator 50 could also be referred to as a global bit OB_Freeze, e.g., a bit in a register of the controller 30, and must be set and reset by software before or after an access to the output buffer. Likewise, the second status indicator 51 can be set and reset by software before or after an access to the output buffer as a global bit IB_Freeze, this bit too is a bit in a register of the controller 30.

To this end, the blocking device 31 is operated in the control device 30 such that, before a write access with output data to the output buffer 21a, 22a or before a read access of input data to the input buffer 21b, 22b, either the first status indicator 50 or the second status indicator 51 is set, so that with one of the set status indicators 50, 51, a switch between the first and the second transfer memory is blocked, whereby data consistency is achieved.

Figure 3:
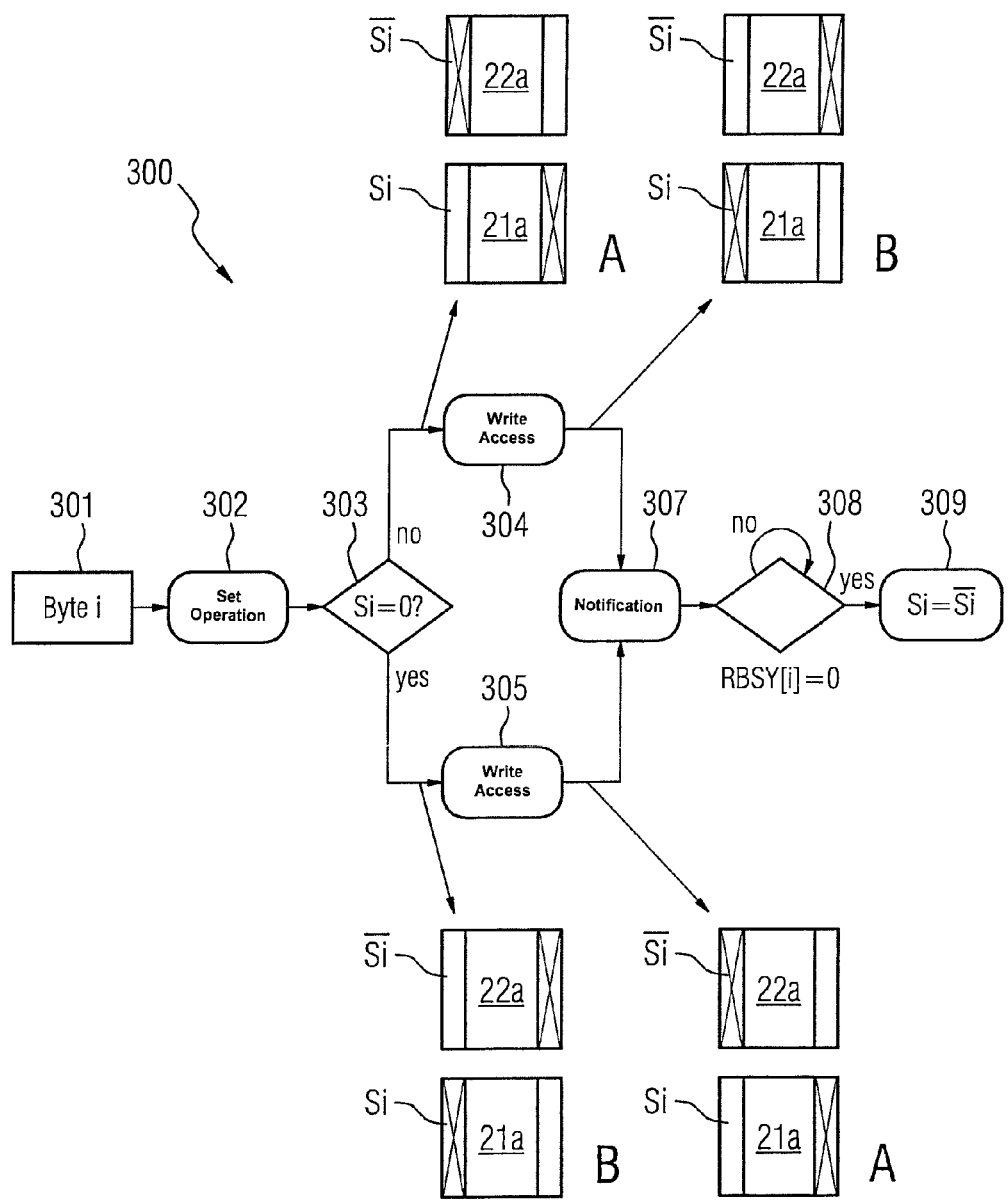
FIG. 3 shows a program flowchart for writing output data in accordance with the invention.

FIG. 3 shows a program execution sequence 300 for the writing of output data, where the output data is sent from the automation device 110 shown in FIG. 1 by the first bus system 11a to the interface device and is accepted from the interface device 1 in the first transceiver device 11. The program execution sequence 300 shows a possible implementation in a suitable programming language for an Application Specific IC (ASIC), for example, where this ASIC would then be used in the interface device 1 as a control device 30.

The program execution sequence 300 starts with a write order 301, in which the order is contained to write a byte i, which is likewise provided in the list storage device 40 with the index i, into one of the two output buffers 21a and 22a. The decision as to which of the two output buffers 21a, 22a into which the byte i is ultimately written, is made via an interrogation operation 303.

In any event, the first status indicator 50 is preset to the value "1" using a set operation 302. By software implemented, for example, in the ASIC, preferably before data is written into the data transfer device 20 before data is read from the data transfer device, a bit is to be set, where the set bit serves to indicate that at this point in time no change of memory may be performed. In relation to the writing of output data, this means that the first output buffer 21a and the second output buffer 22a are frozen.

With the interrogation operation 303, a semaphore $S_i$ is interrogated. The semaphore $S_i$ is also embodied as a bit, for example, which can assume the state "0" or "1".

In accordance with FIG. 3, in addition to the program execution sequence 300, a first stable state A and a second stable state B are shown. In this diagram of the stable states A, B, a state of the byte of a payload data block, preferably of a subslot, is shown in each case. In this case, this byte is an extract from the byte-oriented first transfer memory 21 or second transfer memory 22. In particular, in the presentation of the first stable state A and of the second stable state B, a byte of the first output buffer 21a or a byte of the second output buffer 22a is meant in the program execution sequence 300 for the writing of output data.

The semaphore $S_i$ or the negated value of the semaphore $S_i^{-1}$ each represent the permissibility of a possible write access to this byte-oriented address of the output buffer 21a or 22a.

From the interrogation operation 303 of the semaphore $S_i$, the sequence reaches a write access 304 to the first output buffer 21a via a NO branch, i.e., the semaphore $S_i$ has a value $S_i$="1".

The write order 301 initiated at the start now has permission to write into the byte-granular memory cell of first output buffer 21a addressed with the index i, an arrow starting from the NO branch of the interrogation operation 303 points symbolically to the first stable state A, which is a representation before the write access. After the write access 304 to the first output buffer 21a, a further arrow points symbolically to the second stable state B of the byte-granular memory cells of the first output buffer 21a and of the second output buffer 22a.

The second stable state B has been reached via a notification 307 to change memory and via a further interrogation operation 308 as to whether the first status indicator 50 is set to "0" again, and whether a further variable "backplane bus in operation" (short form: RBSY[i]) likewise has the value "0". If this is the case, the correspondingly previously initiated semaphore $S_i$ is negated by a memory change action 309 and an auxiliary vector is set (New Data[N:0]) which is used for notification of the memory change after a write access to the byte i.

If the interrogation operation 303 had produced the value of the semaphore $S_i$="0", the program execution sequence 300 would have been continued with the YES branch of the interrogation operation 303 and a write access 305 to the second output buffer 22a would have been allowed. The semaphore $S_i$ has the value "0" for this state. As a result, the second stable state B of a byte-granular memory value in the output buffer 21a, 22a would now have been valid. This is again indicated by a symbolic arrow. After successful write access 305 to the second output buffer 22a and the notification 307 for a memory switchover with the continuous interrogation operation 308 of whether the first status indicator 50="0" and the RBSY[i]-variable="0" and the semaphore $S_i$ has ultimately been negated in the memory switch action 309, in this lower part of the program execution sequence 300 after the write access 305, the first stable state A is now reached starting from the second stable state B.

Figure 4:
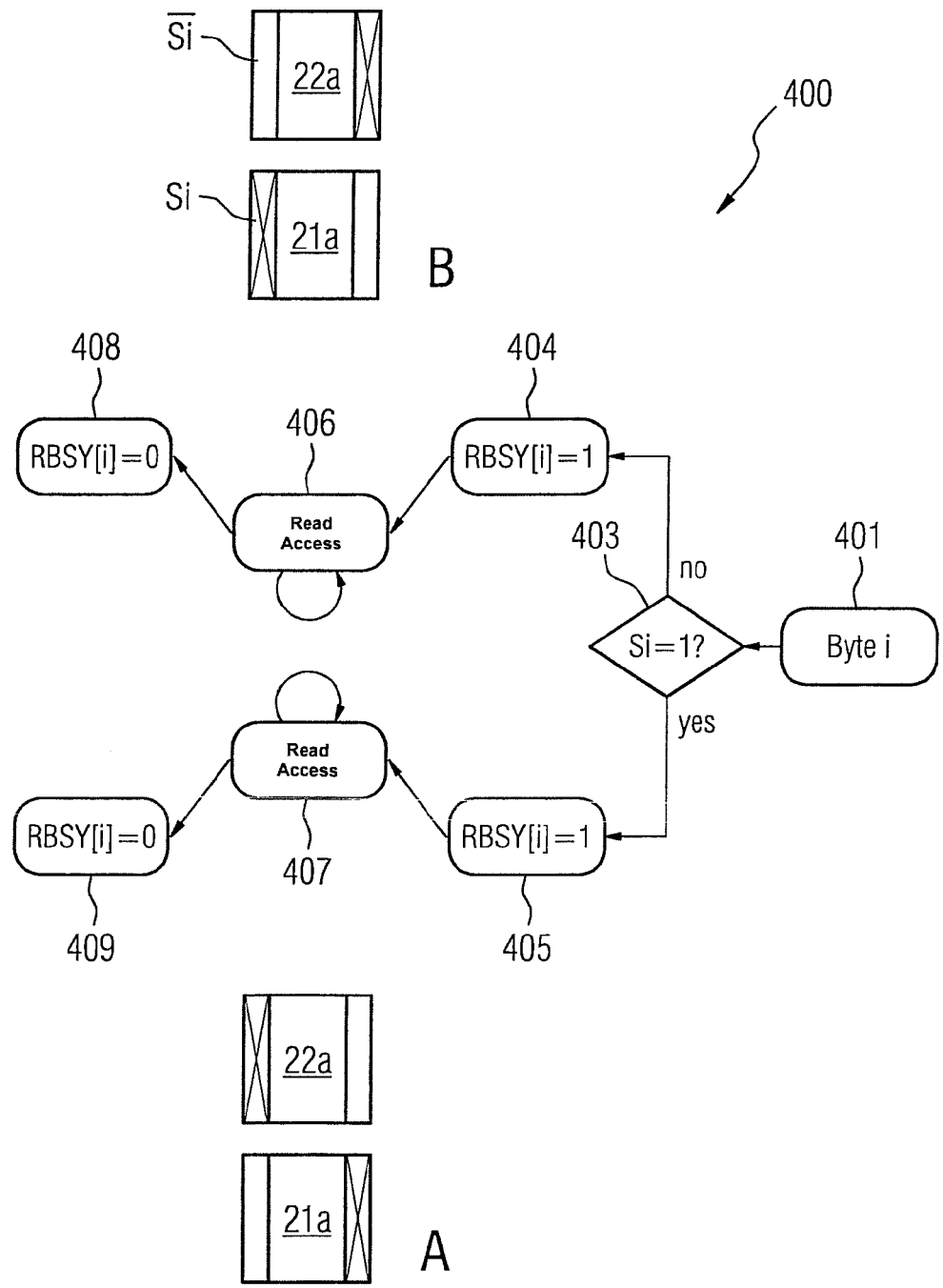
FIG. 4 shows a program flowchart for reading output data in accordance with the invention.

FIG. 4 shows a program execution sequence 400 for reading output data from the corresponding first output buffer 21a or the second output buffer 22a. The program execution sequence 400 starts with an order 401 to read a byte i. The byte i can, for example, be a byte within a payload data block of a subslot. The memory address of this byte i is determined via the list storage device 40.

In relation to FIG. 1, the read order 401 means that the input/output device 100, for example, via the first slot 101, via the first subslot 111, has provided a byte or an entire payload data block via the backplane bus of the interface device 1.

The read order 401 is followed by an interrogation operation 403 as to whether the semaphore $S_i$ belonging to the byte i="1". If it does, there is an exit from the interrogation operation 403 via the YES branch and a set operation 405 follows in which the variable RBSY[i]="1" is set. There now exists an identifier that the backplane bus is in operation. There may now be a read access 407 to the second output buffer 22a. The first stable state A is presented to symbolize the byte-granular access. After a successful read access to the second output buffer 22a, the variable RBSY[i] can be reset to "0" via a further setting operation, which means that the backplane bus is not in operation.

If exit from the interrogation operation 403 was with the NO branch, which means that the semaphore $S_i$ had the value "0", then the variable RBSY[i] is once again set via a set operation 404 and there is a read access 406 to the first output buffer 21a. This state in its turn is symbolized by the second stable state B. After the successful access 406 to the first output buffer 21a, the variable RBSY[i] is set to "0" in a setting operation 408.

Figure 5:
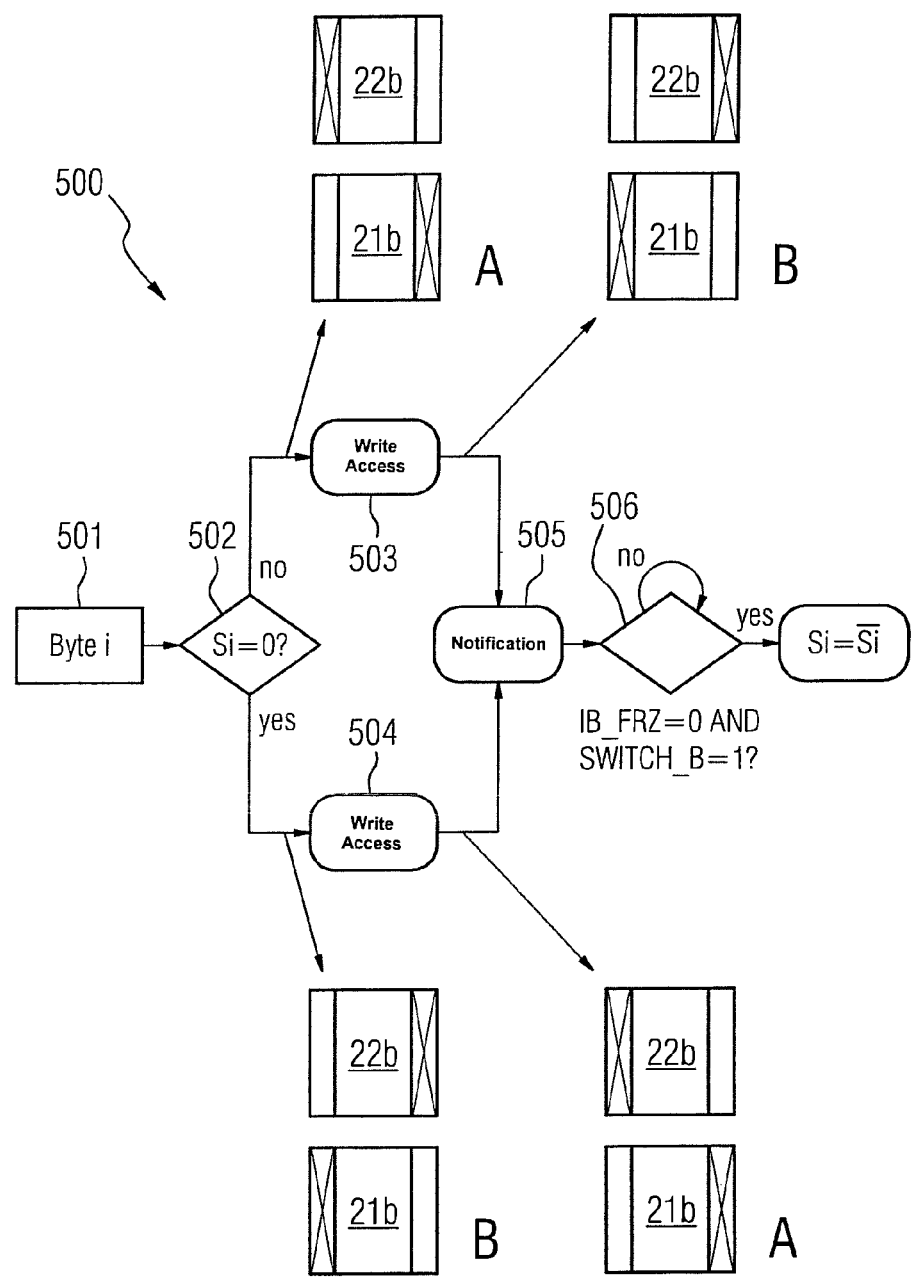
FIG. 5 shows a program flowchart for writing data from a backplane bus controller into an input buffer in accordance with the invention.

FIG. 5 presents a program execution sequence 500 for writing data of the backplane bus controller 32 into the input buffer or buffers 21b, 22b. Starting with a write order 501, in which the backplane bus controller wishes to write the byte i into the corresponding input buffer 21b, 22b, an interrogation is first performed in an interrogation operation 502 as to whether the semaphore $S_i$ belonging to the byte i has the value "0". If the semaphore has the value "1", then the sequence exit from the interrogation operation 501, 502 is via the NO branch and a write access 503 to the first input buffer 21b with the byte I is allowed.

If the semaphore $S_i$ had the value="0", then a write access 504 to the second input buffer 22b would be allowed via the YES branch of the interrogation operation 502. After a successful write access either to the first input buffer 21b or to the second input buffer 22b, there is an interrogation with an interrogation operation 506 via a notification 505 of change of memory as to whether the second status indicator 51="0". There is also an interrogation as to whether a release signal for a memory switchover is present. The release signal comes from the backplane bus controller, for example, and signifies whether the entered data is complete, or whether there are still data packets missing. If the release signal is set, the memory switchover is performed and the semaphore $S_i$ is negated, through which there is a switch in the upper branch with the write access 503 to the first input buffer 21b from the first stable state A into the second stable state B, and via the write access 504 to the second input buffer 22b there is conversely a switch from the second stable state B into the first stable state A of the byte-granular addressed memory cells.

Figure 6:
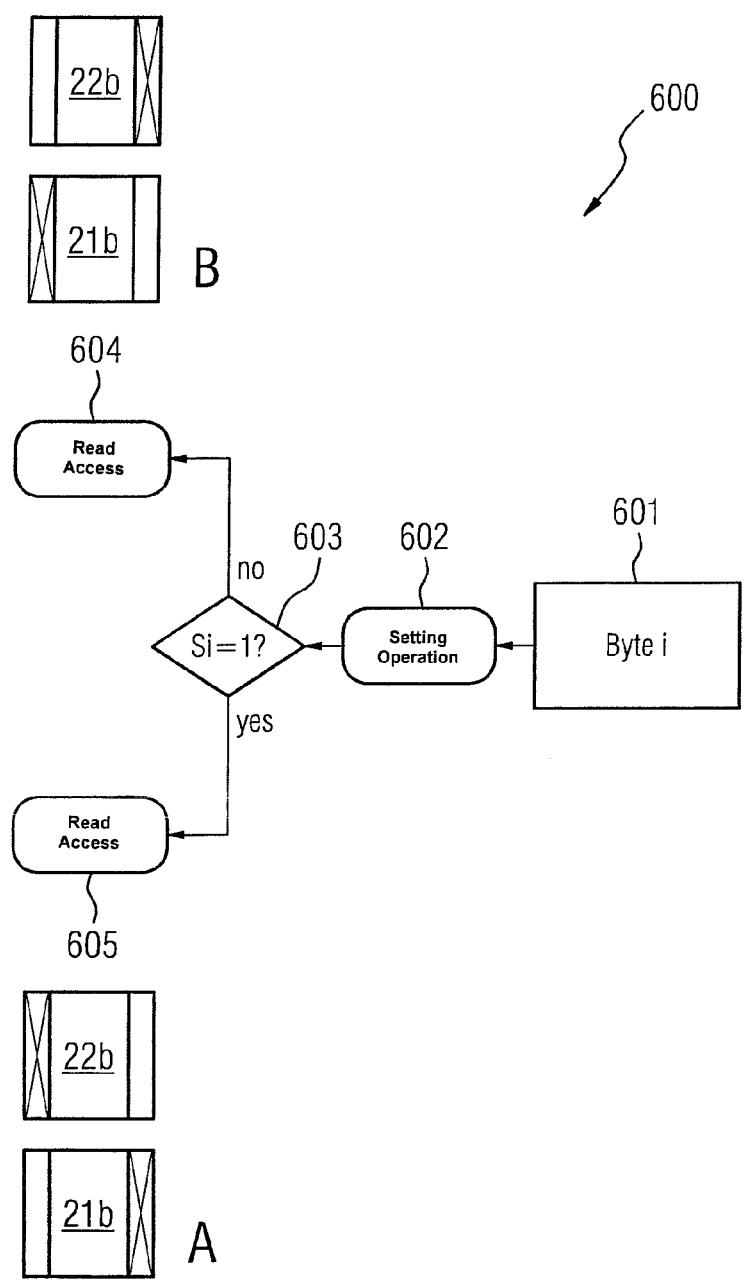
FIG. 6 shows a program flowchart for reading data out of the input buffer in accordance with the invention.

FIG. 6 shows a program execution sequence 600 for reading data from the input buffers 21b, 22b. Beginning with a read order 601, a read access is initiated with the software implemented in the ASIC to the input buffer 21b, 21a. Since input data is now to be forwarded from the backplane bus to the automation device, before the read access the second status indicator 51 must be set via a setting operation 602, through which ultimately a "IB_FREEZE" command is issued, which means that the corresponding input buffers 21a and 21b are now frozen. An interrogation operation 603 interrogates via the byte-granular addressing with the index i as to whether the semaphore $S_i$ of this byte to be read i="1". If it is, there may be access via a read access 605 to the second input buffer 22b and in the event that the semaphore $S_i$="0", there may be access via a further read access 604 to the first input buffer 21a. By way of explanation, the program execution sequence 600 is once again assigned the first stable state A and the second stable state B of the byte-granular memory cells at the corresponding memory access branches.

While there have been shown, described, and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An interface device for exchange of data between a first bus system and a second bus system, wherein an input/output device is connectable to the second bus system and the input/output device includes an addressable slot and an addressable subslot for outputting or accepting input/output data, the interface device comprising:
a first transceiver device for data of the first bus system;
a second transceiver device for data of the second bus system;
a data transfer device including a transfer memory;
a controller configured to control data storage and to coordinate write accesses in the data transfer device or at the data transfer device;
a list storage device connected to the controller, the list storage device storing a data structure for addressing data for the input/output device, the data structure being predetermined for a plurality of subslots in a telegram format of telegrams of the first bus system, the list storage device including a memory offset related to a start address of the transfer memory and a data length of the input/output data, and each of the plurality of subslots in the data structure being assigned an index;
wherein the control device is further configured to update the input/output data aided with by the index to coordinate the write accesses in the data transfer device byte-by-byte;
wherein the transfer memory comprises a first transfer memory and a second transfer memory, the first and second transfer memories being connected to the control device such that a storage of data or a write access is implemented one of only to the first transfer memory and only to the second transfer memory;
wherein the control device includes a blocking device configured to set the status indicator before a write access with output data to the output buffer or before a read access of input data to the input buffer; and
wherein the control device is further configured such that the blocking device blocks a switch between the first transfer memory and the second transfer memory when the status indicator is set.

2. The interface device as claimed in claim 1, wherein the transfer memory is divided up into an output buffer configured to buffer data from the first bus system and to provide said buffered data to the second bus system as output data for the input/output device and into an input buffer; and wherein the output buffer configured to buffer data from the second bus system and to provide the buffered data to the first bus system as input data of the input/output device.

3. The interface device as claimed in claim 1, wherein the interface device is configured to operate in a network of an industrial automation system; wherein the first transceiver device is configured for data of the first bus system to sending and receive data of a field bus of industrial automation technology and the second transceiver device is configured for data of the second bus system to send and receive data of a backplane bus of the input output device equipped as a decentralized peripheral of the industrial automation technology, the control device further include a backplane bus controller and a field bus controller.

4. A method for consistent data exchange between a first bus system and a second bus system, the method comprising the steps of:
connecting an input/output device to the second bus system;
addressing a slot and a subslot within the input/output device to output or accept input/output data;
operating a first transceiver device to send and receive data of the first bus system;
operating a second transceiver device to send and receive data for the second bus system;
controlling a data transfer device including a transfer memory via a control device to control data storage and to coordinate write accesses into the data transfer device or at the data transfer device;
evaluting, by the control device, a data structure from a list storage device, the data structure for addressing the data for the input output device being stored before a beginning of the data exchange in the list storage device and the data structure being defined based on a plurality of sub slots in a telegram format of telegrams of the first bus system, and the list storage device including a memory offset related to a start address of the transfer memory and data lengths of the input output data, and each of the plurality of subslots in the data structure being assigned an index;
operating a blocking device in the control device;
setting a status indicator; and
blocking a switch between the first and the second transfer memory with the set status indicator before one of a write access with output data to the output buffer and before a read access of input data to the input buffer;
wherein the control device, for an updating of the input/output data, coordinates the write accesses into the data transfer device byte-by-byte with the aid of the index.

5. The interface device as claimed in claim 2, wherein the control device is further configured to interrogate a semaphore and depending on a state of the semaphore read out output data from one of the first transfer memory and the second transfer memory for a read access of output data from the output buffer.

6. The interface device as claimed in claim 5, wherein the transfer memory is structured byte-by-byte and each byte is assigned a semaphore with the index; wherein a byte in the first transfer memory is assigned the semaphore with a first state and a corresponding byte in the second transfer memory is assigned a semaphore with a second state; and wherein the second state corresponds to the negated first state.

7. The interface device as claimed in claim 1, wherein the list storage device comprises a first list storage device and a second list storage device.

8. The method as claimed in 4, wherein the transfer memory is divided into an output buffer and an input buffer; the method further comprising the steps of:
operating the output buffer to buffer data from the first bus system and provide the buffered data to the second bus system as output data for the input/output device; and
operating the input buffer to buffer data from the second bus system and to provide the buffered data to the first bus system as input data of the input/output device.

9. The method as claimed in claim 4, wherein the transfer memory is divided up into a first transfer memory and a second transfer memory, wherein the controls a data storage or a write access such that one of only access to the first transfer memory and only access to the second transfer memory occurs.

10. The method as claimed in claim 4; wherein the list storage device is maintained as a duplicated list and a first list storage device and a second list storage device are created.

11. The method as claimed in claim 4, further comprising the steps of:
implementing the method in a network or industrial automation system;
operating the first transceiver device is operated for data of a field bus of industrial automation technology;
operating the second transceiver device for data of a backplane bus of the input/output device which is configured as a decentralized peripheral of industrial automation technology; and
operating a backplane bus controller and a field bus controller in the control unit.

12. The method as claimed in claim 8, wherein the transfer memory is divided up into a first transfer memory and a second transfer memory, wherein the controls a data storage or a write access such that one of only access to the first transfer memory and only access to the second transfer memory occurs.

13. A method for consistent data exchange between a first bus system and a second bus system, the method comprising the steps of:
connecting an input/output device to the second bus system;
addressing a slot and a subslot within the input/output device to output or accept input/output data;

operating a first transceiver device to send and receive data of the first bus system;

operating a second transceiver device to send and receive data for the second bus system;

controlling a data transfer device including a transfer memory via a control device to control data storage and to coordinate write accesses into the data transfer device or at the data transfer device;

evaluting, by the control device, a data structure from a list storage device, the data structure for addressing the data for the input output device being stored before a beginning of the data exchange in the list storage device and the data structure being defined based on a plurality of sub slots in a telegram format of telegrams of the first bus system, and the list storage device including a memory offset related to a start address of the transfer memory and data lengths of the input output data, and each of the plurality of sub slots in the data structure being assigned an index;

interrogating a semaphore; and reading the output data is read from one of the first transfer memory and the second transfer memory depending on a state of the semaphore to perform a read access of output data from the output buffer;

wherein the control device, for an updating of the input/output data, coordinates the write accesses into the data transfer device byte-by-byte with the aid of the index.

14. A method for consistent data exchange between a first bus system and a second bus system, the method comprising the steps of:

connecting an input/output device to the second bus system;

addressing a slot and a subslot within the input/output device to output or accept input/output data;

operating a first transceiver device to send and receive data of the first bus system;

operating a second transceiver device to send and receive data for the second bus system;

controlling a data transfer device including a transfer memory via a control device to control data storage and to coordinate write accesses into the data transfer device or at the data transfer device;

evaluting, by the control device, a data structure from a list storage device, the data structure for addressing the data for the input output device being stored before a beginning of the data exchange in the list storage device and the data structure being defined based on a plurality of sub slots in a telegram format of telegrams of the first bus system, and the list storage device including a memory offset related to a start address of the transfer memory and data lengths of the input output data, and each of the plurality of sub slots in the data structure being assigned an index;

storing the data byte-by-byte in the transfer memory; and assigning each byte a semaphore with the index;

wherein a byte in the first transfer memory is assigned a semaphore with a first state and a corresponding byte in the second transfer memory is assigned a semaphore with a second state; the second state corresponding to a negated first state; and wherein the control device, for an updating of the input/output data, coordinates the write accesses into the data transfer device byte-by-byte with the aid of the index.

* * * * *